United States Patent [19]

Hanna

[11] Patent Number: 4,567,620
[45] Date of Patent: Feb. 4, 1986

[54] VEHICLE WASHING APPARATUS WITH IMPROVED WASHING ELEMENTS

[76] Inventor: Daniel C. Hanna, 1133 SW. Rivington Dr., Portland, Oreg. 97201

[21] Appl. No.: 502,320

[22] Filed: Jun. 8, 1983

Related U.S. Application Data

[63] Continuation-in-part of Ser. No. 437,454, Oct. 28, 1982, Pat. No. 4,439,883.

[51] Int. Cl.$^4$ ............................................. B60S 3/06
[52] U.S. Cl. ............................ 15/97 B; 15/DIG. 2; 15/230.14; 15/230.16
[58] Field of Search ............... 15/97 R, 97 B, DIG. 2, 15/230.14, 230.16, 4, 104.92, 210 R, 228, 230, 230.17, 230.19

[56] References Cited

U.S. PATENT DOCUMENTS

| | | |
|---|---|---|
| 171,832 | 1/1876 | McIntyre . |
| 374,706 | 12/1887 | Rosenkranz . |
| 437,454 | 10/1882 | Hanna . |
| 2,311,135 | 2/1943 | Steinmetz et al. . |
| 2,638,617 | 5/1953 | Doering . |
| 2,663,041 | 12/1953 | Rende .................... 15/97 B |
| 3,774,259 | 11/1973 | Genaro ................... 15/97 B |
| 3,868,740 | 3/1975 | Brovig . |
| 3,869,833 | 3/1975 | Belanger . |
| 3,939,521 | 2/1976 | Clark . |
| 4,059,862 | 11/1977 | Ashton . |
| 4,104,756 | 8/1978 | Gasser .................... 15/97 B |
| 4,173,805 | 11/1979 | Silcock ................... 15/97 B |
| 4,285,736 | 8/1981 | Arato . |
| 4,337,000 | 6/1982 | Lehmann . |
| 4,338,698 | 7/1982 | Beer et al. . |
| 4,377,878 | 3/1983 | Pecora . |

FOREIGN PATENT DOCUMENTS

1630527  12/1970  Fed. Rep. of Germany .

Primary Examiner—Edward L. Roberts
Attorney, Agent, or Firm—Klarquist, Sparkman, Campbell, Leigh & Whinston

[57] ABSTRACT

One embodiment of the invention comprises a vehicle washing apparatus having an array of downwardly depending plural fabric panels. These panels are of varying widths and are slit at multiple locations along their side margins to provide fingers of material between the slits. These fingers reach into and clean otherwise hard to reach areas of a vehicle, such as the window area immediately beneath an overhanging roof. A drive mechanism rotationally oscillates the array about a vertical axis. Selected panels of the array are oriented in non-parallel planes for enhanced washing of different portions of the vehicle. The array is detachably mounted to an overhead frame of the vehicle wash. Another embodiment of the invention comprises a vehicle washing apparatus having plural downwardly depending washing elements, each with one or more of such slit fabric panels mounted to an upright flexible support. The washing elements may be suspended from an oscillating frame. In addition, the individual washing elements may also be oscillatable. The support may be hollow and porous or perforated for delivery of fluid to the panels. In addition, the support may be of a larger dimension at the bottom than at the top. Therefore, when filled with fluid, the lower portion of the washing element is heavier. Thus, the element will contact the vehicle to a greater extent as the vehicle is cleaned.

22 Claims, 10 Drawing Figures

VEHICLE WASHING APPARATUS WITH IMPROVED WASHING ELEMENTS

CROSS REFERENCE TO RELATED APPLICATION

This application is a continuation-in-part application of co-pending U.S. application Ser. No. 06/437,454 of Daniel C. Hanna, filed Oct. 28, 1982, now U.S. Pat. No. 4,439,883 and titled Vehicle Washing Apparatus.

BACKGROUND OF THE INVENTION

1. Field of the Invention

This invention relates to a vehicle washing apparatus with downwardly depending vehicle washing elements and to improved vehicle washing elements.

2. Description of the Prior Art

Conventional carwashing devices typically include downwardly depending fabric panels or mitters. These panels are typically held at their upper edges and split into multiple verticle strips which hang downwardly in the path of a vehicle traveling through the carwash. The strips drag along and clean the surface of the vehicle. To enhance cleaning by these fabric panels, they are frequently displaceable relative to the traveling vehicle. For example, several prior art designs employ a mechanism for reciprocating the suspended panels from side-to-side. Other designs use support systems which oscillate the panels rotationally about a horizontal axis.

In addition to devices with depending fabric panels, rotatable fabric scrubbing brushes have been proposed, as exemplified by U.S. Pat. Nos. 4,377,878 of Pecora and 4,338,698 of Beer et al. The brushes of these devices are understood to include cloth panels mounted to a rigid central hub or shaft. The panels are split in a direction normal to the shaft to provide plural fabric strips. In operation, it is believed that the shafts are oriented vertically for brushes used to clean the sides of a vehicle. In addition, brushes with horizontal shafts are believed used to clean the hood, roof, trunk, and other top surfaces of a vehicle. Thus, as the above described depending panels, the strips of brushes used to clean the top surfaces of a vehicle are vertical.

These devices suffer from a number of drawbacks, including their ineffectiveness in cleaning difficult to reach surfaces of a vehicle. For example, the overhanging roof of many vehicles tends to hold these vertically disposed strips away from the area of the windshield immediately underneath the overhang. Furthermore, brush type devices utilize combinations of side brushes and top brushes instead of a single washing apparatus which is capable of washing a relatively large percentage of the vehicle surface. In addition, many prior art designs are relatively complicated, making them costly to manufacture, purchase, and maintain.

Therefore, a need exists for an improved carwashing apparatus directed towards overcoming these and other problems of prior art devices.

SUMMARY OF THE INVENTION

One embodiment of the invention comprises a vehicle washing apparatus having an array of plural downwardly depending fabric panels. These panels are slit inwardly at multiple locations along their side margins to provide fingers of material between the slits. The fingers reach into and clean otherwise hard to reach areas of a vehicle, such as the window area immmediately beneath an overhanging vehicle roof. A drive mechanism may be provided for imparting motion, for example rotational oscillation, to the array of panels relative to a vehicle in the wash. Another embodiment of the invention comprises a vehicle washing apparatus having plural downwardly depending washing elements, each with one or more of such slit fabric panels mounted to an upright flexible support. The washing elements contact and clean the upper and side surfaces of a vehicle as it travels through the carwash. These washing elements may be suspended from an oscillating frame. In addition, the individual washing elements may also be oscillatable relative to the frame for enhanced cleaning.

As another feature of the invention, the panels are of varying widths and the depth of the slits and spacing between the slits generally increase with increasing widths of the panels.

As a more specific feature of the invention, the depth of each slit is approximately one-third the width of each panel to provide the desired stiffness of the panel and flexibility of the fingers of material between the slits.

As still another more specific feature of the invention, the slits are horizontal.

As another feature of the invention, the array includes panels oriented in non-parallel planes to enhance the washing of different portions of a vehicle.

As a further feature of the invention, when the array is in a first position, selected washing panels are oriented in planes parallel to the direction of vehicle travel while other washing panels are positioned in planes normal to the direction of vehicle travel.

As another feature of the invention, the array includes plural sections of panels with each such section including parallel rows of panels, with the rows of panels of certain of the sections being normal to the rows of panels of others of the sections.

As still another feature of the invention, the panels of certain sections of the array are of a different width than the width of the panels of other sections of the array, to enhance the cleaning of a vehicle.

As another feature of the invention, the array is detachably mounted to an overhead framework of the carwash so that it may be easily removed and replaced with an array of a different configuration or with a different type of carwashing component.

As a more specific feature of the washing elements, plural panels are mounted to the flexible support and means is provided for delivering fluid to the panels for lubricating the panels and for washing a vehicle.

As another aspect of these washing elements, the support is hollow for carrying fluid to the panels and may be porous or perforated to permit the flow of fluid from the interior of the support to the panels.

As still another feature of the washing elements, the hollow support is larger in dimension at the bottom than at the top. Therefore, when the support is filled with fluid, the lower portion of the washing element is heavier and tends to follow the contour of the car to a greater degree as the washing element passes in contact with the surfaces of a vehicle.

As still another feature of the invention, the washing elements may be driven with an instantaneous motion which is opposite in direction to the direction of motion of the supporting frame.

Accordingly, it is one object of the invention to provide an improved vehicle washing apparatus and also to provide improved washing panels and elements for such an apparatus.

It is another object of the invention to provide a carwashing apparatus with enhanced capacity of cleaning difficult to reach surfaces of a vehicle.

It is another object of the present invention to provide a carwashing apparatus having downwardly depending vehicle washing panels or elements, which is capable of cleaning a relatively large percentage of the surface of a vehicle being washed.

It is another object of the invention to provide a means for mounting and operating a plurality of downwardly depending washing panels or elements in which the dirt from vehicles is more evenly distributed among the panels or elements during operation of the apparatus, so that the panels or elements may be used for a substantial period of time without replacement or cleaning.

Still another object of the present invention is to provide a means for mounting and operating downwardly depending washing panels in which the panels are being reciprocated from side-to-side while simultaneously oscillating vertically.

A further object of the present invention is to provide a means for mounting and operating plural washing elements in which the framework supporting the elements, and thus the elements, is moved relative to a vehicle being washed, and in which the individual washing elements are also moved relative to the supporting framework and relative to the vehicle.

A further object of the present invention is to provide a carwashing apparatus which is relatively simple in design and therefore inexpensive to purchase, operate, and maintain.

These and other objects, features, and advantages of the invention will become apparent with reference to the description and drawings below.

DESCRIPTION OF THE PREFERRED EMBODIMENTS

Embodiment of FIGS. 1 through 5

Figure 1:
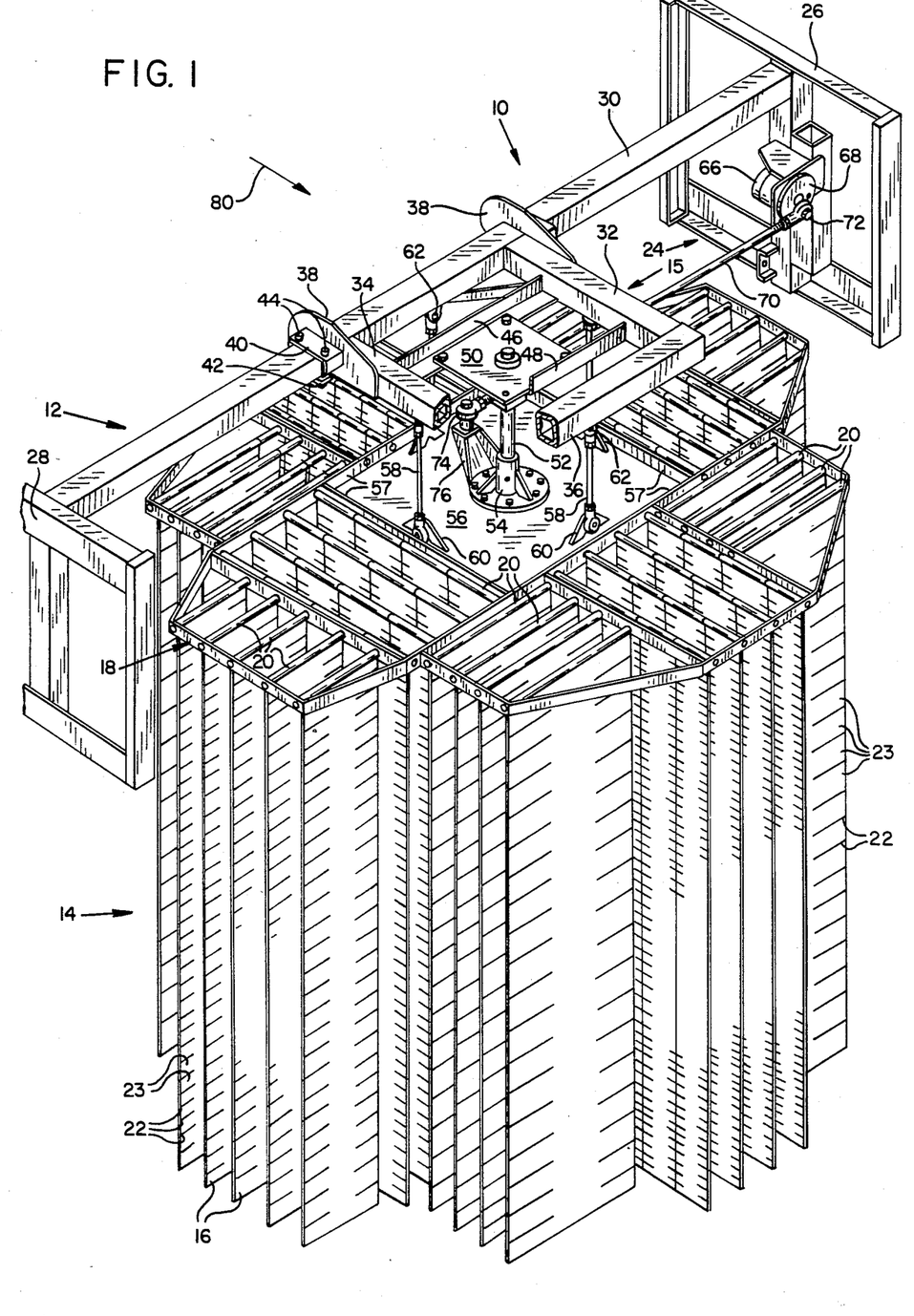
FIG. 1 is a perspective view of one embodiment of a vehicle washing apparatus in accordance with the invention, including an array of downwardly depending washing panels.

With reference to FIG. 1, a vehicle washing apparatus 10 in accordance with the invention is illustrated and includes an upper frame 12 which is connected to an overhead framework of the vehicle wash. A washing element indicated generally at 14 is suspended by a support or suspension system 15 from the frame 12. This washing element comprises a panel array support frame 18 from which an array of plural downwardly depending fabric panels 16 are suspended. Each of these panels is secured along its upper edge 20 to a portion of the frame 18, as explained in greater detail below. These panels hang downwardly in the path of a vehicle traveling in a conventional manner in direction 80 through the wash.

The side margins of panels 16 are provided with plural spaced apart cuts or slits 22 extending inwardly from the panel side edges. Fingers of fabric 23 are provided between these cuts and, as explained more fully below, reach into and clean the difficult to reach surface areas of the vehicle. In the illustrated embodiment, the slits are horizontal and parallel to the upper supported edge. These slits may be angled relative to one another and still provide the desired fabric fingers 23 at the side margins of the panels.

Figures 3, 4, 5:
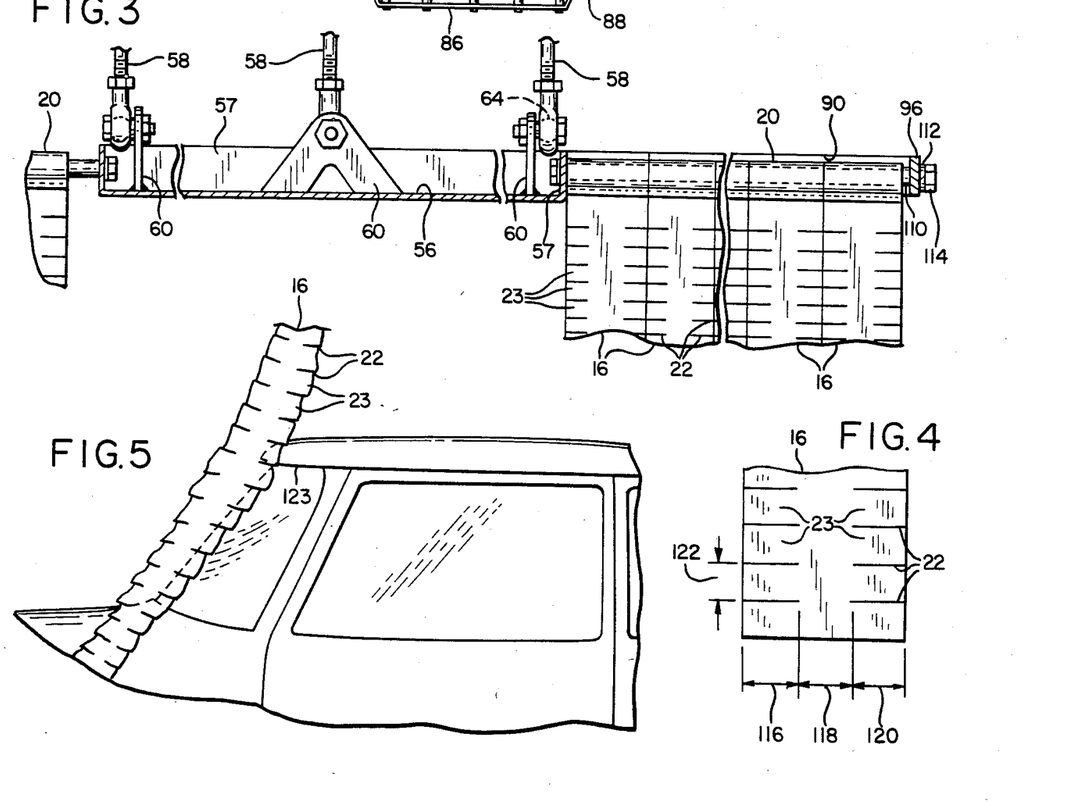
FIG. 3 is a sectional view of the array of FIG. 2, taken along lines 3—3 thereof.
FIG. 4 is a front elevational view of a portion of a washing panel in accordance with the invention.
FIG. 5 is an illustration of a single washing panel of FIG. 4 engaging the front portion of a vehicle.

With reference to FIG. 4, the panels 16 are of a flexible material and are preferably of cloth or fabric, such as indoor-outdoor carpet. The panels may be of varying widths. The depth of the slits 116, 120 is variable, and in the illustrated preferred embodiment is approximately one-third of the overall width of the panel. This leaves a body or central region 118 of the panel which is uncut and of a width which is about one-third the width of the panel. In addition, the spacing 122 between the slits is variable and is selectively increased with panels of increasing width and depths of cuts. A table of exemplary panel dimensions is as follows:

| Width of Panel in Inches | Depth of Cuts in Inches | Spacing between Cuts in Inches |
| --- | --- | --- |
| 6 | 1.5 | 1 |
| 9 | 3 | 2 |
| 12 | 4 | 2 |
| 15 | 5 | 3 |
| 18 | 6 | 3 |

Although these dimensions may vary, they do provide panels of a desired strength and stiffness, and with fingers of sufficient flexibility and size for enhanced cleaning of various portions of a vehicle.

Referring again to FIG. 1, a drive mechanism 24 is provided for driving the washing element 14. This drive mechanism may take many forms, but in the illustrated form described below, it comprises a means for oscillating the array of panels about a vertical axis and also for simultaneously shifting these panels vertically as they oscillate. Consequently, the panels and fingers thereon are agitated and urged into the various crevices and surface areas of the vehicle as it moves through the wash.

As shown in FIG. 1, the frame 12 includes first and second rigid reinforced rectangular end members 26, 28. In addition, a horizontal rigid box beam 30 extends between the end members 26, 28.

The washer element support system 15 includes a rigid U-shaped mounting frame, comprised of side legs 32, 34 and an end piece 36. These members are cantilevered outwardly from the cross beam 30. A respective clamping mechanism is mounted to the end of each leg 32, 34 for detachably fastening the associated leg, and thus the support system 15 to the cross beam 30. Each clamping mechanism includes a flange 38, mounted to an associated side leg, which passes over the top of the cross beam 30. The flange supports a downwardly opening clamp member 40 which rests on the top of the cross beam. An opposing clamp member 42 is positioned along the underside of the cross beam. Bolts 44 secure clamp members 40, 42 together with the cross beam therebetween. This in turn secures the legs 32, 34, and support 15 rigidly in place. With this construction, the support 15 and carried washing element 14 may be easily removed by simply loosening bolts 44. Therefore, washing element 14 may be replaced with a differently configured array of panels or with a different type of washing element, such as an overhead brush, as desired without significant equipment downtime. This also enhances the flexibility of the vehicle washing system, as various types of vehicle washing elements are easily interchanged.

Included in the suspension support 15 are a pair of angle beams 46, 48 extending transversely between the legs 32, 34. These beams support a flat plate 50 to which a downwardly projecting vertical shaft 52 is rotatably mounted. A collar 54 is slidably mounted to the shaft. The collar is also connected to a rigid pan 56 which comprises a portion of the panel array support frame 18. Pan 56 includes upwardly extending sidewall portions 57 along its periphery for supporting certain of the panels 16, as explained below.

Plural links or arms 58 are also provided for supporting the pan 56 and hence the array of panels 14. Each of these arms is connected at its lower end to an associated ear 60 which projects upwardly from the pan 56. Similar ears 62 project downwardly from elements 30, 32, 34, and 36 at locations directly above the ears 60. The upper end of each arm 58 is connected to an ear 62 above the associated ear 60. As best seen in FIG. 3, the arms 58 are connected to the respective ears by a spherical or ball-type connection 64. This permits each of the arms 58 to slightly shift angularly with respect to their mounts. As a result, angular displacement of these arms resulting from rotational oscillation of the panel array supporting frame 18 is accommodated.

With reference again to FIG. 1, oscillation mechanism 24 includes an oscillation shaft 70 connected at one end 74 to a bracket or web 76 mounted to the pan 56. Shaft end 74 is offset from the pan supporting shaft 52. Consequently, reciprocation of oscillation shaft 70 causes the pan 56, panel array frame 18, and supported panels 16 to rotationally oscillate. The opposite end 72 of the oscillation shaft 70 is eccentrically mounted to a drive plate 68. This drive plate in turn is rotated by a motor 66. Rotation of the drive plate 68 causes oscillation shaft 70 to reciprocate, which in turn rotationally oscillates the suspended array of panels 16. The ends 72, 74 of the oscillation shaft 70 are connected to the respective drive plate 68 and web 74 in the same manner as the manner in which arms 58 are connected to ears 60, 62. This accommodates the slight vertical displacement of the oscillation shaft 70 as it is driven. Also, the ends of the oscillation shaft are threaded and include adjustment nuts to permit adjustment of the effective length thereof as necessary. An on-off switch is positioned adjacent to the drive motor, or in a position where it may be readily reached by the operator of the vehicle wash.

Figure 2:
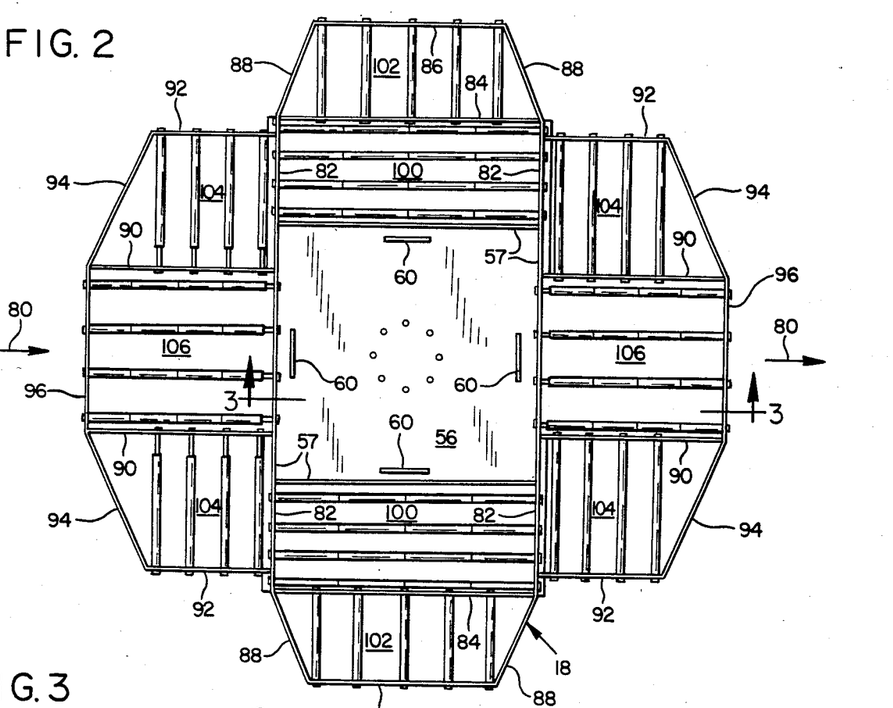
FIG. 2 is a top plan view of the array of washing panels of FIG. 1.

FIG. 2 discloses the array of panels of washing element 14 in a starting, non-rotationally displaced position. For purposes of discussion, the front of the array will be defined as that portion which is first encountered by a vehicle in the wash, and is at the left-hand side of FIG. 2. The rear of the array, at the right hand side of FIG. 2, is the portion of the array from which the vehicle exits. Finally, the sides of the array are the upper and lower portions of FIG. 2. As can be seen from FIG. 2, frame 18 includes rigid frame components which separate the array into plural sections 100, 102, 104, and 106 of panels 16. These frame components support the upper ends of the panels of the sections.

More specifically, a pair of sections 100 are provided at a location adjacent the respective sides of the pan 56. These sections are each defined by frame components 82, 84 and a pan side wall 57. Plural, in this case four, parallel rows of panels 16 are supported within the respective sections 100. These rows of panels are oriented in planes parallel to the direction 80 of vehicular travel through the wash. Each row includes four nine-inch wide panels which primarily perform the task of cleaning the sides of the vehicle as the vehicle passes through the wash.

A pair of sections 102 are provided at the outer sides of the array, each being positioned adjacent a respective one of the sections 100. The sections 102 are defined by frame elements 84, 86, and 88. Plural, in this case five, rows of panels are supported within the sections 102 and are oriented in planes normal to the direction of vehicular travel. In the illustrated embodiment, each of these rows comprises a single, twelve-inch wide, panel having the primary function of cleaning the sides of the vehicle. Because the panels of sections 102 are normal to the panels of sections 100, they tend to clean any vehicle surface areas missed by the panels of sections 100.

Sections 104 are located at the four corners of the array and are surrounded by portions of the pan walls 57 and frame components 82, as well as by the frame components 90, 92, and 94. Each of these sections supports plural, in this case four, rows of panels oriented in a plane normal to the direction of vehicular travel. The panels of sections 104 at the front of the array are fifteen inches in width, while those of section 104 at the rear of the array are eighteen inches in width. As the vehicle enters the wash, the panels of the upper front section 104 in FIG. 2 oscillate against and clean the front area of the vehicle at the driver's side. At the same time, the lower front section 104 oscillates against and cleans the front area of the vehicle at the passenger's side. Also, as the vehicle leaves the carwash, the rear area of the driver's side of the vehicle is cleaned by the panels of the upper rear section 104. In addition, the rear area of the passenger's side of the vehicle is cleaned by the panels of the lower rear section 104.

Finally, first and second sections 106 are provided at the front and rear of the array between the sections 104. These sections 106 are each surrounded by a portion of pan wall 57 and by frame components 90 and 96. Plural rows, in this case four, of panels are supported in these sections as well. These panels are oriented in a plane parallel to the direction of vehicular travel. In addition, the panels are narrower than the other panels of the array, for example six inches in width. Also, the fingers 23 of these panels are smaller, making them more capable of reaching into and cleaning the fine spaces of the grillwork and tail regions of the vehicle as it enters and leaves the carwash.

With reference to FIG. 3, the panels are typically mounted in a similar manner to the panel array support frame 18 and will be described for one row of panels. More specifically, a tube 110 extends between the spaced apart opposing frame components 96 and pan wall 57. The ends of this tube are drilled and tapped to receive cap screws 114 which, together with lockwashers 112, secure the tube to the frame 18. The upper ends of the panels 16 are folded around the tube 110 and then sewn or otherwise fastened together to mount the panels to the tube. With this construction, the panels may rapidly be removed and replaced merely by disconnecting the cap screws.

In operation, rotation of drive plate 68, to which oscillation shaft 70 is eccentrically mounted, causes the panel supporting frame 18 to rotationally oscillate through approximately forty to fifty-five degrees. While shaft 52 is fixed to provide a stationary axis of rotational oscillation, the collar 54 mounted to it is permitted to pivot first in one direction and then in the other. As oscillation shaft 70 rotationally displaces the panel supporting frame 18, the arms 58 shift angularly. Because the length of each of the arms is fixed, angular displacement of arms 58 causes a change in the vertical elevation of pan 56 the and entire panel array supporting frame 18. Relative vertical movement between the supporting frame 18 and the overhead frame 12 is possible because the collar 54 is free to slide upwardly and downwardly along the shaft 52.

The rotational and vertical oscillation of the downwardly depending panels 16 results in an extremely effective washing action. The rotational side-to-side oscillation of the panels causes different ones of the panels to initially contact the vehicle, so that the vehicle dirt is more evenly distributed among the panels. This side-to-side oscillation also causes both sides of each of the panels to contact the vehicle. Furthermore, the simultaneous vertical oscillation of the panels 15 results in a more effective washing of the vehicle because of the greater amount of relative movement between the vehicle and the panels. This vertical oscillation also results in the panels bouncing up and down, tending to cause the panels to contact the vehicle in a more random fashion than would otherwise occur. This minimizes streaking of dirt on the vehicle, and also insures that a relatively high percentage of the vehicle surface will be contacted by the panel.

Moreover, with reference to FIG. 5, because of the slits provided in the panel 16, the fingers 23 are shifted and bounced about by this movement of the array. This urges these fingers into difficult to reach areas of the vehicle such as, for example, the area of the windshield 123 immediately beneath the overhanging roof of the vehicle. In addition, these fingers are agitated into the surfaces of crevices of the vehicle, such as present in the grill.

Description of the Embodiments of FIGS. 6 through 10

Figures 6, 7, 8, 9, 10:
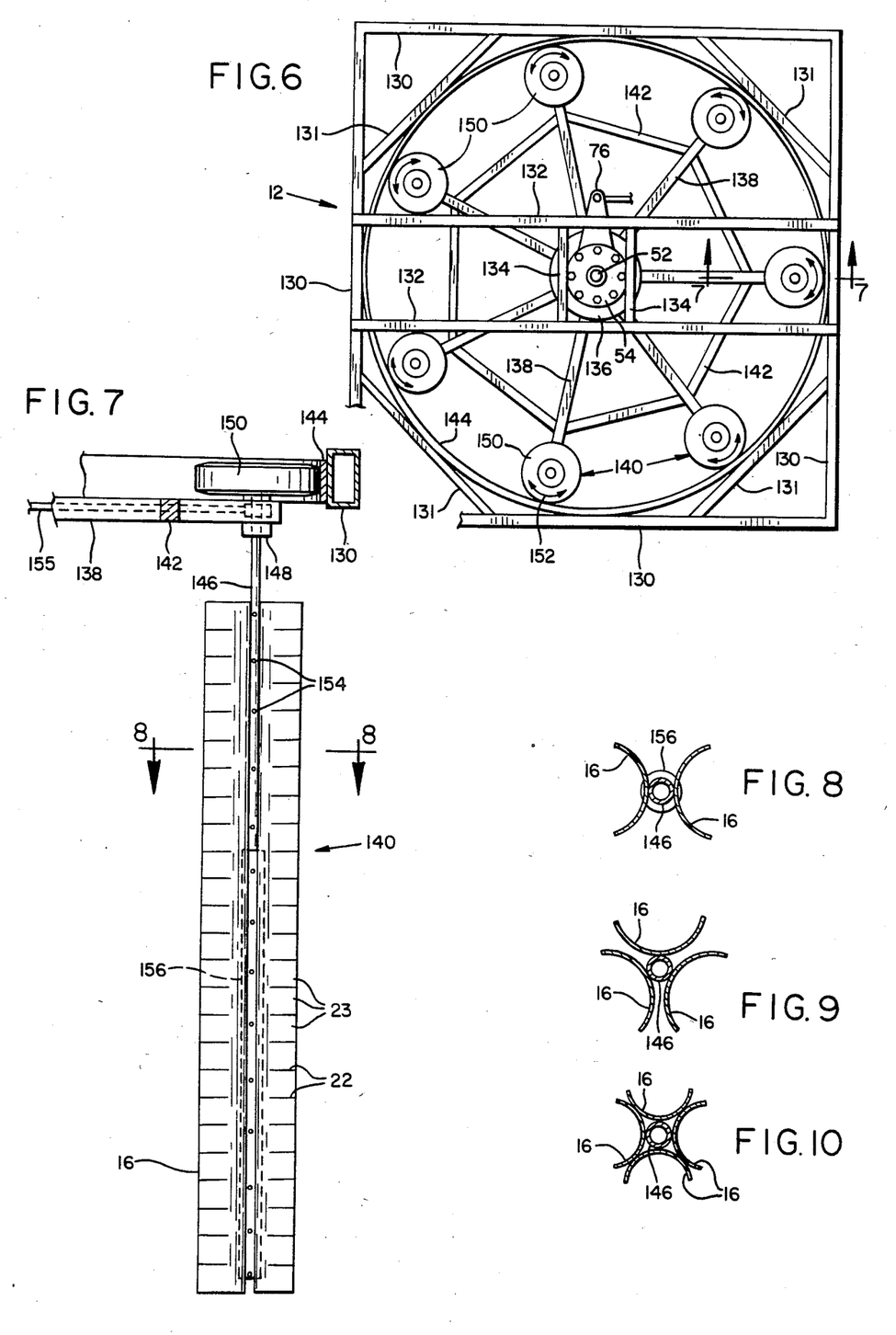
FIG. 6 is a top plan view of another embodiment of a vehicle washing apparatus of the invention, which includes a driven support frame and plural washing elements which are individually driven relative to the frame.
FIG. 7 is a vertical section view of the vehicle washing apparatus of FIG. 6, taken along line 7—7 thereof.
FIG. 8 is a cross sectional view of a two panel washing element of FIG. 7, taken along line 8—8 thereof.
FIG. 9 is a cross sectional view of a washing element including three panels.
FIG. 10 is a cross sectional view of a washing element including four panels.

With reference to FIG. 6, the frame 12 includes a rectangular framework comprised of rigid beams 130 reinforced by corner braces 131. Transverse spaced apart frame members 132 extend between two of the beams 130 with lateral cross braces 134 extending between members 132. A shaft 52 is suspended from cross braces 134 in the same manner as described above in connection with FIG. 1. Also, a collar 54 is mounted to the shaft 52, as described in connection with FIG. 1. This collar is fastened to a support plate 136 which functions in a similar manner to the pan 56 of FIG. 1.

Plural radially outwardly extending rigid arms 138 project from the plate 136 and are reinforced by cross beams 142. Each of the arms 138 supports a washing element 140 which is described in detail below. In addition, for reasons explained below, a circular track 144 is mounted to the overhead frame 12.

In addition, a mechanism is provided for oscillating the plate 136, and thus the arms 138 and connected washing elements 140 as a group. This mechanism may be as shown in FIG. 1 with a bracket 76 and an oscillating arm.

With reference to FIG. 7, each washing element comprises a flexible support 146 to which at least one panel 16 having slits 22 and fingers 23 is mounted. The panels are mounted in an upright manner with the central unsplit portion of the panel connected to the support 146 in a suitable manner. For example, the panel may be held between a plastic strip (not shown) and the support with screws mounting the plastic strip to the support.

In the illustrated embodiment, fluid such as rinse water, detergent water, or wax is delivered through the supports 146 to the panels 16. This fluid lubricates the panels where they contact the vehicle and also enhance the cleaning operation. To accomplish this, the supports 146 and arms 138 are tubular and hollow. In addition, a fluid supply tube 155 extends within the hollow interior of the arm 138 for delivering fluid from a source, not shown, to the support 146. The support 146 is porous or has perforations 154 along its length so that the delivered fluid passes outwardly from the support to the panels. In addition, the lower portion 156 of the support 146 is of enlarged dimension relative to the upper portion. Consequently, when the tube is filled with fluid, the washing elements 140 are heavier at the bottom than at the top. As a result, as the vehicle is engaged by the washing elements, this added weight at the bottom of the elements tends to hold them against the vehicle, resulting in improved cleaning. The support 146 may take many suitable forms. For example, it may comprise a rubber hose which is perforated along its length, a porous fabric hose through which fluid weeps, or it may comprise a portion of panels which are stitched together so as to provide a hollow interior fluid delivery cavity between the panels.

Also, any number of panels may be mounted to the support 146 as desired. FIGS. 8, 9, and 10 show respective embodiments having two, three, and four such panels.

For enhanced vehicle cleaning, in addition to the overall oscillation of the frame 12, the washing elements 140 are driven in oscillation. A bearing coupling 148 pivotally mounts each support 146 to its associated arm 138. A tire 150, is drivenly connected to each support 146. Pivoting movement of the tire 150 causes a corresponding movement of the associated support 146 and connected washing element 140. The tire 150 bears against the circular track 144. Consequently, as the plate 136 oscillates, the tire also oscillates as indicated by arrows 152 in FIG. 6. However, the instantaneous motion of the tire, and hence of the connected washing element, is in a direction opposite to the direction of motion of the plate 136. A rotary union couples the tube 155 to the support 146 so that a fluid passageway is provided between these elements. A similar rotary coupling, not shown, is provided at shaft 52 so that fluid may be delivered to the respective tubes 155 at this central location.

Of course, it should be understood that various changes and modifications of the preferred embodiment described herein will be apparent to those skilled in the art. For example, instead of the illustrated oscillating drive mechanism, a rotational drive mechanism may be utilized, or a mechanism which eliminates the vertical oscillation. In addition, the panels may simply be suspended without any drive mechanism, although cleaning would be less effective. In addition, the orientation and size of the panels within an array may be shifted as desired. Furthermore, an array of panels or washing elements including combinations of panels with and without horizontal slits may be employed. Such changes and modifications, as well as others, come within the spirit and scope of the present invention. It is, therefore, intended that such changes and modifications be covered by the following claims.

I claim:

1. A vehicle washing apparatus comprising:
   an elevated frame;
   vehicle washing means supported by said frame, said vehicle washing means including plural downwardly depending flexible panel means, each said means supported along an upper edge margin for contacting and cleaning a vehicle in a vehicle wash, plural ones of said panel means each having multiple spaced apart inwardly directed slits along their side edges so as to provide fingers between the slits which contact and clean difficult to reach and other surfaces of the vehicle.

2. A vehicle washing apparatus according to claim 1 in which said washing means includes an array support frame means and an array of panel means supported by said array support frame means, certain of said panel means being supported in planes skewed from planes containing others of said panel means.

3. A vehicle washing apparatus according to claim 2 including drive means for moving the array supporting frame and panel means relative to the elevated frame and thereby relative to a vehicle in the vehicle wash.

4. A vehicle washing apparatus according to claim 3 in which said drive means comprises means for rotationally oscillating said array supporting frame and thereby said panel means.

5. A vehicle washing apparatus according to claim 1 in which, with the array in a first position, selected ones of said panel means are positioned in planes parallel to the direction of vehicle travel through the vehicle wash and others of said panel means are positioned in planes normal to the direction of vehicle travel.

6. A vehicle washing apparatus according to claim 1 in which said washing means comprises an array of panel means, the array including plural sections of plural panel means, the panel means of each such section comprising parallel rows of panel means.

7. A vehicle washing apparatus according to claim 6 in which the rows of panels of certain of said sections are non-parallel to the rows of panels of others of the sections.

8. A vehicle washing apparatus according to claim 6 in which the panel means of first sections are of narrower width than the panel means of second sections, said panel means of first sections having slits which are not as deep as and are spaced closer together than the slits of the panel means of second sections.

9. A vehicle washing apparatus according to claim 8 in which said panel means of first sections are positioned to engage the grill and tail areas of a vehicle.

10. A vehicle washing apparatus according to claim 1 including suspension means for detachably mounting said array support frame means to said elevated frame so that said array support frame means, and thus said array of panel means, may be removed and replaced with an array of a different configuration or with another vehicle washing component.

11. A vehicle washing apparatus comprising:
    an elevated frame;
    vehicle washing means supported by said frame, said vehicle washing means including plural downwardly depending flexible panel means for contacting and cleaning a vehicle in the vehicle wash, plural ones of said panel means having multiple spaced apart inwardly directed slits along their side edges so as to provide fingers between the slits which contact and clean difficult to reach and other surfaces of the vehicle;
    said vehicle washing means including a washing element support frame means, means for connecting said washing element support frame means to said elevated frame, plural washing elements pivotally connected to said washing element support frame means, each of said washing elements including at least one of said slit panel means, support frame drive means for moving said washing element support frame means and washing elements as a group relative to the elevated frame and thereby relative to a vehicle in the vehicle wash, and washing element drive means for moving the washing elements relative to said washing element support frame means and thereby relative to a vehicle in the vehicle wash.

12. A vehicle washing apparatus according to claim 11 in which said support frame drive means comprises means for oscillating said washing element support frame and said washing element drive means comprises means for oscillating said individual washing elements in an instantaneous direction which is opposite to the instantaneous direction of oscillation of said washing element support frame.

13. A washing element for a vehicle wash having an elevated framework comprising:
    a flexible panel having an upper edge margin and including means formed on the upper edge margin for attachment to the framework of the wash such that the panel is suspended in a downwardly depending manner from the framework of the wash;
    said panel having multiple spaced apart inwardly directed slits along its side edges so as to define fingers along its side margins between the slits, said fingers contacting and cleaning difficult to reach and other surfaces of the vehicle.

14. A washing element according to claim 13 in which the means formed on the upper edge margin comprises a folded portion of the upper edge margin of the panel which defines a means for attachment of the panel to the framework of the wash.

15. A washing element according to claim 14 in which the panel is rectangular and the slits are horizontal.

16. A washing element according to claim 13 including fluid passageway means for delivering fluid to the panel.

17. A washing element according to claim 16 in which said fluid passageway means extends substantially coextensive along the length of the panel, said fluid passageway means being of a larger dimension at the bottom than at the top.

18. A washing element for a vehicle wash having an elevated framework comprising:
plural flexible panels of at least two different widths;
means for supporting each of said panels in a downwardly depending manner from the framework of the wash;
said panels each having multiple spaced apart inwardly directed slits along its side edges so as to define fingers along its side margins between the slits, said fingers contacting and cleaning difficult to reach and other surfaces of the vehicle; and
the depth of the slits and spacing between the slits of a panel of a first width is less than the depth of the slits and spacing between the slits of a panel of a greater width.

19. A washing element for a vehicle wash having an elevated framework comprising:
plural flexible panels of different widths;
means for supporting each of said panels in a downwardly depending manner from the framework of the wash;
said panels each having multiple spaced apart inwardly directed slits along its side edges so as to define fingers along its side margins between the slits, said fingers contacting and cleaning difficult to reach and other surfaces of the vehicle; and
the depth of the slits increase with increasing panel widths.

20. A washing element for a vehicle wash having an elevated framework comprising:
at least one flexible panel adapted for suspension in a downwardly depending manner from the framework of the wash;
said panel having multiple spaced apart inwardly directed slits along its side edges so as to define fingers along its side margins between the slits, said fingers contacting and cleaning difficult to reach and other surface of the vehicle;
said washing element including flexible support means adapted for suspension in a downwardly depending manner from the framework of the wash, the unslit central portion of said at least one panel being mounted to said support means.

21. A washing element according to claim 20 including plural of said panels and in which a central portion of each one of the plural panels is mounted to said support means.

22. A washing element according to claim 20 in which said flexible support means is hollow and perforated so as to define a fluid passageway through which fluid may be delivered to the panel.

* * * * *

UNITED STATES PATENT AND TRADEMARK OFFICE
CERTIFICATE OF CORRECTION

PATENT NO.  : 4,567,620
DATED       : February 4, 1986
INVENTOR(S) : DANIEL C. HANNA It is certified that error appears in the above-identified patent and that said Letters Patent are hereby corrected as shown below:

Column 12, line 17, "surface" has been changed to

--surfaces--.

Signed and Sealed this

Twenty-second Day of April 1986

[SEAL]

Attest:

DONALD J. QUIGG

Attesting Officer

Commissioner of Patents and Trademarks